United States Patent [19]
Bertsch

[11] 3,879,944
[45] Apr. 29, 1975

[54] CATALYTIC CONVERTER
[75] Inventor: Joseph F. Bertsch, Orchard Lake, Mich.
[73] Assignee: General Motors Corporation, Detroit, Mich.
[22] Filed: Mar. 20, 1974
[21] Appl. No.: 452,737

[52] U.S. Cl. ............................... 60/299; 23/288 F
[51] Int. Cl. ............................................ F01n 3/14
[58] Field of Search ....... 60/299; 23/288 F, 288 FA, 23/288 FB

[56] References Cited
UNITED STATES PATENTS
3,824,788    7/1974    Cole................................... 60/301
FOREIGN PATENTS OR APPLICATIONS
1,257,056    2/1961    France............................. 23/288 F Primary Examiner—Douglas Hart
Attorney, Agent, or Firm—Robert M. Sigler

[57]  ABSTRACT

A catalytic converter has a cylindrical can with open ends. Exhaust gases admitted through one end may flow through a first catalyst bed to openings in the side wall of the can or through the narrow end of a funnel shaped container projecting through an opening in the center of the first catalyst bed. A second catalyst bed, coaxial with the first, is placed in the wide end of the funnel shaped container to increase the catalyst bed flow area. A housing containing the can has walls which define an annular passage around the can through which the exhaust gases flow upon emerging from the beds to increase heating of the catalyst beds for faster catalyst warm-up.

2 Claims, 2 Drawing Figures

CATALYTIC CONVERTER

SUMMARY OF THE INVENTION

My invention relates to a compact, efficient, quick heating catalytic converter for treating the exhaust gases of a combustion engine. The features of my catalytic converter make it particularly useful as a small converter to be mounted directly on the exhaust manifold of an engine to be heated rapidly to operating temperature from a cold start and treat the exhaust gases until a larger converter at some other location in the exhaust system is warm enough to be effective.

My converter achieves its compact size by the use of two coaxially arranged catalyst beds in a container designed to deliver a portion of the exhaust gas flow to each of the beds. Quick heating is achieved by surrounding both catalyst beds with hot exhaust gases, and in particular by the provision of an annular passage for exhaust gases emerging from the catalyst beds to flow back along the outer surface of the container.

Further details and advantages of my invention will be apparent from the drawings and description of the preferred embodiment.

DESCRIPTION OF THE PREFERRED EMBODIMENT

Figure 1:
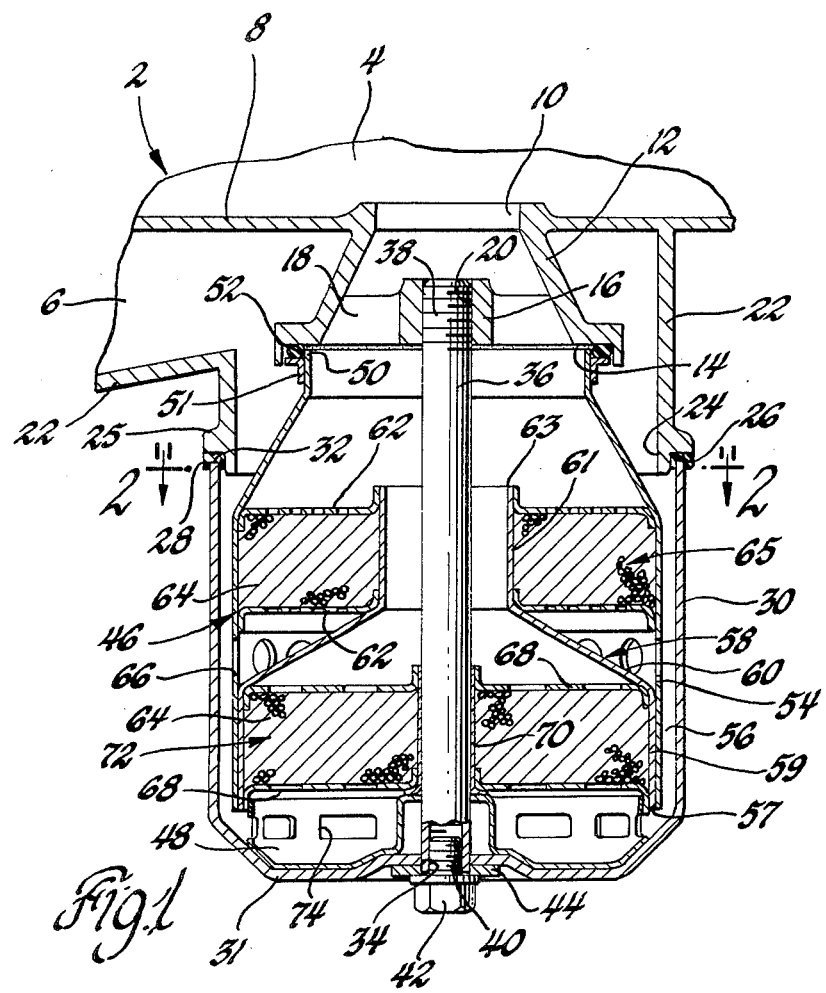
FIG. 1 shows a catalytic converter according to my invention fixed to an engine exhaust manifold.

Referring to FIG. 1, the combustion engine exhaust manifold 2 is divided by a wall 8 into an exhaust collection passage 4 and an exit passage 6. The exhaust collection passage, is adapted to receive exhaust gases from the combustion engine, not shown; and the exit passage 6 is adapted to deliver the exhaust gases to the remainder of the exhaust system.

An opening 10 in the wall 8 is surrounded by a mounting flange 12 which flares outward from the wall 8 into the exit passage 6. The free end of the mounting flange 12 is formed into an annular seat 14. A hub 16 is rigidly held in an axially centered position within the flange 12 by a plurality of spokes 18. The hub 16 has formed therein a threaded opening 20 axially aligned with the flange 12 and opening 10.

The outer wall 22 of the exit passage 6 has an opening 24 therethrough surrounded by a mounting flange 25 with an annular seat 26. On the annular seat 26 is placed a deformable annular sealing member 28.

A generally cylindrical casing 30 has a closed end 31 and an open end 32. The casing 30 is positioned with its open end 32 in sealing engagement with the deformable annular sealing member 28 in axial alignment with the openings 10, 14 and 20. The closed end 31 of casing 30 has an axially central opening 34 therethrough. A tubular member 36 has an externally threaded end 38 retained in the opening 20 and an internally threaded end 40 projecting through the opening 34. A bolt 42 is threaded into the internally threaded end 40 of the tubular member 36 and tightened down with a sealing washer 44 against the closed end of the casing 30 to hold the latter tightly in place. The casing 31, in turn, holds in place a converter element 46. The converter element 46 is generally cylindrical and pierced along its axis by the tubular member 36. It has an end cap 48 at one end adjacent to the closed end 31 of the casing 30; and it has an open end 50 with a flange 51 welded thereto, flange 51 compressing an annular sealing member 52 against the annular seat 14 of the mounting flange 12. The annular sealing members 28 and 52, being deformable, allow the casing 30 and the converter element 46 to be sealed against annular seat 26 and annular seat 14, respectively, by the single bolt 42 and tubular element 36 in spite of variations in axial length resulting from the manufacturing process.

The converter element 46 comprises an outer can 54, most of the axial length of which forms a cylinder of diameter slightly smaller than the casing 30 to form an annular exhaust return passage 56 therebetween. Close to the annular seat 14 of the mounting flange 12, the outer can 54 tapers smoothly inward to form the open inlet end 50, which is somewhat smaller in diameter than the remainder of the outer can 54.

An inner can 58 is contained within the outer can 54. The inner can 58 in funnel shaped with a wide end 57 and large diameter portion 59 fixed to the wide end of the outer can 54, an inner tapering portion 60 and a small diameter inlet portion 61 extending toward the open end 50 of the outer can 54, and ending in a narrow end 63. Between the small diameter portion 61 of the inner can and the wide portion of the outer can 54 are fixed two axially spaced perforated annular disks 62. Each of the disks 62 has a flange formed at its inner circumference for attachment to the inner can 58 and another at its outer circumference for attachment to the outer can 54. The annular volume between the disks 62 is filled with pellets 64 made of a suitable substrate material and coated with a catalytic material such as platinum. The pellets 64 between the disks 62 comprise a first catalyst bed 65 in the converter element 46. The perforations in the disks 62 allow circulation of exhaust gases through the first catalyst bed in an axial direction. A circumferential ring of openings 66 through the outer can 54 between the first catalyst bed and the inner can 58 allow the exhaust gases that have flowed through the first catalyst bed to escape into the annular exhaust return passage 56.

Figure 2:
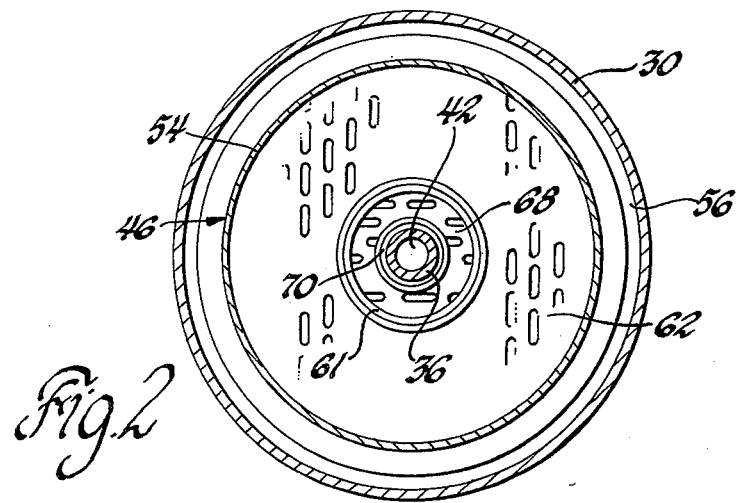
FIG. 2 is a section view along line 2—2 in FIG. 1.

Two more axially spaced perforated annular disks 68 extend between the inner surface of the large diameter portion 59 of the inner can 58 and a tubular member 70 surrounding the tubular member 36. The volume between the disks 68 is filled with additional catalyst coated pallets 64 to form a second catalyst bed 72, through which exhaust gases are allowed to flow by the perforations in the disks 68, as seen in FIG. 2. The disks 68 are also flanged at the inner and outer circumferences for attachment to the inner can 58 and tubular member 70. The end cap 48 is fixed around its circumference to the common joint of the outer can 54, inner can 58 and disk 68; while the center portion thereof is fixed to the tubular members 70 at the point it joins the disk 68. The end cap 48 has a plurality of openings 74 therethrough around the outer circumference thereof, through which exhaust gases having traversed the second catalyst bed 72 can reach the annular return exhaust passage 56. As shown in FIG. 1, the frontal flow area of the second catalyst bed 72 is much larger than the flow area of the small diameter portion 61 of the inner can.

In operation, exhaust gases are forced by engine exhaust pressure from the exhaust collection passage through the opening 10 to the converter element 46.

Upon encountering the small diameter portion 61 of the inner can, the exhaust gases are split into two streams. One stream flows through the first catalyst bed and the openings 66 into the annular exhaust return passage 56; the other stream flows inside the inner can through the second catalyst bed 72 and openings 74 into the annular exhaust return passage 56. The exhaust gases flow back along the outside of the outer can 54 into the exit passage 6, and from there to the remainder of the exhaust system.

The arrangement of coaxial catalyst beds with a separate exhaust stream for each is a compact method of increasing the frontal flow area of the catalyst beds presented to the exhaust gas. The arrangement also provides efficient heat transfer from the exhaust gases to the catalyst beds by surrounding each catalyst bed with exhaust gases and providing return exhaust gas flow back along side the walls of the outer can 54 for additional residence time of exhaust gases within the structure with minimal additional back pressure.

It is understood that the embodiment described above is a preferred embodiment of my invention. Equivalent embodiments will occur to those skilled in the art; and my invention should therefore be limited only by the following claims.

I claim:

1. A device for the catalytic treatment of exhaust gases from an engine comprising, in combination:
   a first can having two open ends, one of said open ends comprising an inlet opening for admittance of said exhaust gases, said first can having a further opening in the wall thereof;
   a second can within the first can, said second can being funnel-shaped with a wide open end in engagement with the other open end of the first can and a narrow open end projecting past the wall opening toward the inlet end of the first can;
   a first catalyst bed in the first can surrounding the narrow end of the second can, said first catalyst bed being located in the path of exhaust gases flowing toward said wall opening;
   a second catalyst bed in the wide end of the second can in the path of exhaust gases flowing through said second can, the second catalyst bed having a frontal area for said exhaust gases greater than the flow area in the narrow end of the second can; and
   housing means surrounding said cans, said housing means defining a flow path for exhaust gases back along the outside of the first can whereby the heating of the first and second catalyst beds by the exhaust gases is increased.

2. An engine exhaust system comprising:
   an exhaust manifold defining an exhaust collection passage adapted to receive exhaust gases from the engine and an exit passage, the manifold including an internal opening between the exhaust collection and exit passages, an external opening from the exit passage, a first mounting flange surrounding the internal opening and extending through the exit passage toward the external opening and a second mounting flange surrounding the external opening and first mounting flange and extending outward from the manifold;
   a generally cylindrical casing having an open end sealingly engaged with the second mounting flange and a closed end;
   an outer can within the casing, the outer can having an open end sealingly engaged with the first mounting flange and another end engaged with the closed end of the housing, the outer can having a first circumferential ring of openings therethrough near its other end and a second circumferential ring of openings between the first circumferential ring and the open end, the outer can and casing forming an annular passage therebetween open to the exit passage at one end and to the interior of the outer can through the second circumferential ring of openings;
   an inner can within the outer can, the inner can having a generally funnel-shaped configuration with narrow and wide open ends, the wide end being fixed within the other end of the outer can between the first and second circumferential rings, whereby the annular passage communicates with the interior of the inner can through the first circumferential ring of openings; and the narrow end extending past the second circumferential ring;
   a first catalyst bed in the outer can, the first catalyst bed being of annular configuration encircling the inner can between the narrow end thereof and the second circumferential ring of openings in the outer can so as to treat exhaust gases flowing through the second circumferential ring of openings; and
   a second catalyst bed in the inner can near its wide end to treat exhaust gases flowing through the first circumferential ring of openings, the second catalyst bed having a larger frontal flow area than the flow area of the narrow end of the inner can.

* * * * *